Mar. 27, 1923.

L. T. MELTON.
DENTAL IMPLEMENT.
FILED JUNE 22, 1922.

1,450,103.

Inventor
L. T. Melton

By *[signature]*

Attorney

Patented Mar. 27, 1923.

1,450,103

UNITED STATES PATENT OFFICE.

LORA T. MELTON, OF MARSHFIELD, MISSOURI.

DENTAL IMPLEMENT.

Application filed June 22, 1922. Serial No. 570,150.

*To all whom it may concern:*

Be it known that LORA T. MELTON, a citizen of the United States, residing at Marshfield, in the county of Webster and State of Missouri, has invented certain new and useful Improvements in Dental Implements, of which the following is a specification.

My invention relates to a dental implement, adapted for shaking and mixing metals or alloys for producing amalgam, while not necessarily restricted to that use.

An important object of the invention is to provide a dental implement of the above mentioned character, which is simple in construction, strong, durable, and is adapted to be stored in the usual drawer of a dental cabinet, with other implements.

A further object of the invention is to provide a device of the above mentioned character, which is adapted for connection with the hand piece of a dental engine, to be driven by the rotating chuck of the same, and to project longitudinally in advance of the hand piece, to form in effect a continuation of the same, for convenience in manipulation.

Other objects and advantages of the invention will be apparent during the course of the following description.

Figure 1:
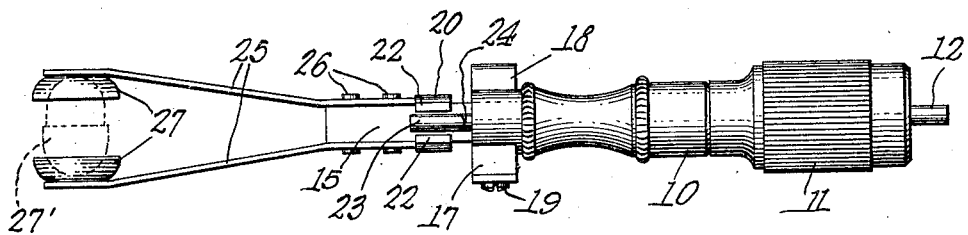
Figure 2:
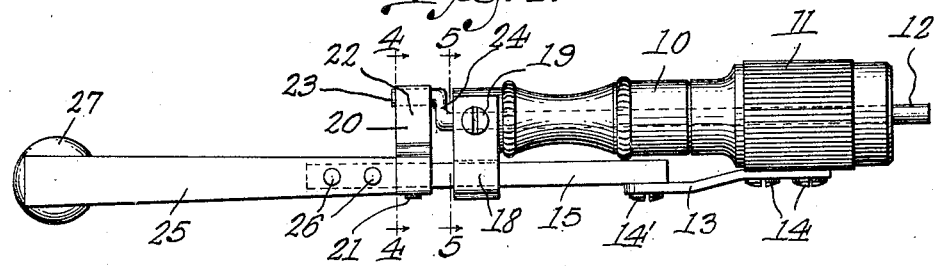
Figure 3:
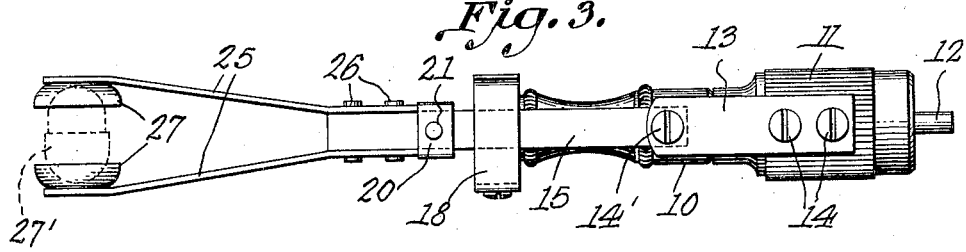
Figure 4:
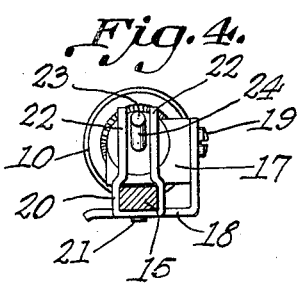
Figure 5:
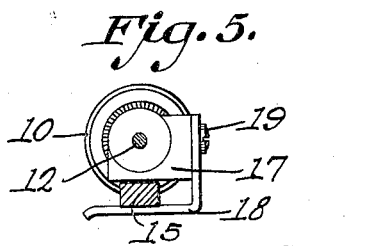

In the accompanying drawings forming a part of this specification and in which like numerals are employed to designate like parts throughout the same, Fig. 1 is a plan view of a device embodying my invention, Fig. 2 is a side elevation of the same, Fig. 3 is a bottom plan view of the device, Fig. 4 is a transverse section taken on line 4—4 of Fig. 2, Fig. 5 is a similar view taken on line 5—5 of Fig. 2.

In the drawings, wherein for the purpose of illustration is shown a preferred embodiment of my invention, the numeral 10 designates a tubular handle, which is preferably straight, and preferably circular in cross-section. This handle has a rear enlarged portion 11, which is preferably milled.

Extending longitudinally within the tubular handle 10 is a driving shaft 12, which projects rearwardly beyond the tubular handle, as shown. This shaft is free to rotate within the tubular handle 10 but cannot partake of perceptible longitudinal movement. The rear end of the shaft 12 is adapted for insertion in the rotatable chuck of the hand piece of a dental engine, which chuck is driven by the usual flexible shaft of the engine, as is well known. The chuck is clamped to the shaft 12 and the hand piece and the handle 10 are therefore arranged in end to end relation, and the hand piece will constitute a continuation of the handle 10.

The numeral 13 designates a supporting element or bar, rigidly attached to the enlarged head 11 by screws 14 or the like. The supporting element 13 is laterally spaced from the handle 10 and has pivotal connection, at 14, with a freely swinging lever 15. This lever projects forwardly beyond the handle and passes between a block 17 and an L-shaped guide 18, rigidly attached to the block, as shown at 19. This block 17 is rigidly secured to the forward end of the tubular handle 10, as shown. The block 17 and the guide 18 constitute a transverse guide way, for the lever 15, whereby the lever is properly guided in its swinging movements, as more clearly illustrated in Figs. 4 and 5.

The numeral 20 designates a U-shaped element or yoke, surrounding the lever 15 and rigidly secured thereto by a screw 21 or the like. This U-shaped element or yoke includes spaced arms 22, receiving therebetween a pin 23, carried by a crank 24 and this crank is formed upon the forward end of the shaft 12. It is thus seen that the rotation of the shaft 12 will cause the rapid oscillation of the lever 15.

The numeral 25 designates a pair of resilient arms, which are clamped to the forward end of the lever, as shown at 26. These arms 25 preferably diverge outwardly and have spaced cups 27 formed upon their forward ends, upon their inner sides. These cups are adapted to receive the sections 27 of a capsule, preferably formed of celluloid or gelatin. This capsule is of course well known and is employed for mixing materials, which would combine with a receptacle formed of metal. The invention is not restricted to the use of a capsule of this character, as any other suitable form of receptacle may be employed.

In operation, the implement is attached to the hand piece of the dental engine by securing the rear end of the shaft 12 in the chuck of the hand piece. The hand piece and handle 10 are therefore arranged in end to end relation which renders holding the implement more convenient. The material to be agitated, such as mercury and silver, are introduced into the capsule 27, and this capsule placed within the cups 26. The handle 10 is held in the hand of the operator, and when the dental engine is set into action, the lever 15 will be violently oscillated, whereby the metals will become thoroughly mixed, ina very short time, such as within a minute. The engine is now stopped and the capsule removed from the implement and the amalgam is ready for use. When the implement is not in use, it is disconnected from the chuck of the hand piece, and by virtue of its shape, it may be inserted in the drawer of the ordinary dental cabinet.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A dental implement comprising a tubular handle adapted to be arranged in end to end relation with the hand piece of a dental engine, a driving shaft mounted within the tubular handle and having one end thereof adapted for insertion within the chuck of the hand piece, a lever pivotally mouted upon the tubular handle and extending longitudinally thereof, a transverse guide way secured to the tubular handle upon one side of the pivot of the lever and receiving said lever, a pair of spaced elements secured to the lever forwardly of the guide way, a crank element carried by the forward end of the operating shaft and operating within the spaced elements, and means secured to the forward end of the lever for holding the metals or the like to be mixed.

2. A detal implement comprising a tubular handle, an operating shaft extending longitudinally through the same and having its rear end adapted for insertiton in the chuck of the hand piece of a dental engine, said operating shaft being provided at its forward end with an element to effect oscillation, a lever extending longitudinally of the handle, means for pivotally connecting the lever with the handle, a member mounted upon the lever and having an opening to receive the element, and arms secured to the lever and projecting forwardly therefrom and provided with holding means.

3. A dental implement comprising a substantially straight tubular handle, an operating shaft rotatable within the handle and having its rear end adapted for insertion within the chuck of the hand piece of a dental engine, said shaft projecting forwardly beyond the hand piece and provided with a crank element, a lever extending longitudinally upon one side of the handle and having its rear end pivotally connected therewith, a guide way extending transversely of the handle and mounted upon its forward end and slidably receiving the lever, a member mounted upon the lever in advance of the guide way and engaging with the crank element, and a pair of arms mounted upon the forward end of the lever and extending longitudinally thereof in a forward direction and provided near their forward ends with a pair of cups.

In testimony whereof I affix my signature.

LORA T. MELTON.